US011975784B2

(12) United States Patent
Augustin

(10) Patent No.: US 11,975,784 B2
(45) Date of Patent: May 7, 2024

(54) COLLISION PROTECTION DEVICE ON A MOTORIZED BICYCLE

(71) Applicant: Bayerische Motoren Werke Aktiengesellschaft, Munich (DE)

(72) Inventor: Stephan Augustin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 699 days.

(21) Appl. No.: 17/260,460

(22) PCT Filed: Jun. 11, 2019

(86) PCT No.: PCT/EP2019/065193
§ 371 (c)(1),
(2) Date: Jan. 14, 2021

(87) PCT Pub. No.: WO2020/015926
PCT Pub. Date: Jan. 23, 2020

(65) Prior Publication Data
US 2021/0309315 A1  Oct. 7, 2021

(30) Foreign Application Priority Data
Jul. 17, 2018  (DE) .................. 10 2018 211 817.5

(51) Int. Cl.
*B62J 27/30* (2020.01)
(52) U.S. Cl.
CPC ..................... *B62J 27/30* (2020.02)
(58) Field of Classification Search
CPC ........................................ B62J 27/30
See application file for complete search history.

(56) References Cited

U.S. PATENT DOCUMENTS 6,511,119 B2 * 1/2003 Takase ............... B62D 21/152
296/203.02
7,144,030 B2 * 12/2006 Buell ....................... B62J 27/30
180/219
(Continued)

FOREIGN PATENT DOCUMENTS

CN       104527864 A    4/2015
DE  10 2009 054 561 B4   11/2020
(Continued)

OTHER PUBLICATIONS

International Search Report (PCT/ISA/210) issued in PCT Application No. PCT/EP2019/065193 dated Aug. 7, 2019 with English translation (four (4) pages).
(Continued)

*Primary Examiner* — Kevin Hurley
*Assistant Examiner* — Hosam Shabara
(74) *Attorney, Agent, or Firm* — Crowell & Moring LLP

(57) ABSTRACT

A collision protection device on a motorized bicycle includes a catching element which is securely mounted on a frame of the motorized bicycle. The catching element includes a receptacle which is delimited by two guide sections and is open in the direction towards a front wheel of the motorized bicycle. The free ends of the guide sections pointing in the direction of travel are arranged such that they are always at a distance from the front wheel during normal riding but, in the event of a front-end collision in which the front wheel impacts on an obstacle, the front wheel is pushed into the receptacle between the free ends of the guide portions towards the frame of the motorized bicycle.

8 Claims, 2 Drawing Sheets

(56) References Cited

U.S. PATENT DOCUMENTS

| | | | | |
|---|---|---|---|---|
| 8,042,640 | B2* | 10/2011 | Namiki | B62K 11/04 |
| | | | | 180/219 |
| 8,122,992 | B2* | 2/2012 | Inoue | B62J 27/30 |
| | | | | 180/232 |
| 8,562,010 | B2* | 10/2013 | Namiki | B62J 27/30 |
| | | | | 280/162 |
| 2008/0023954 | A1* | 1/2008 | Eichberger | B60R 19/16 |
| | | | | 296/187.1 |
| 2010/0148469 | A1 | 6/2010 | Namiki | |
| 2010/0243362 | A1 | 9/2010 | Inoue et al. | |
| 2010/0244468 | A1 | 9/2010 | Namiki et al. | |

FOREIGN PATENT DOCUMENTS

| | | |
|---|---|---|
| EP | 1 362 777 A2 | 11/2003 |
| EP | 2 236 400 A1 | 10/2010 |
| EP | 2 236 401 A1 | 10/2010 |
| JP | 2002-264866 A | 9/2002 |
| JP | 2002264866 A * | 9/2002 |
| JP | 4516231 B2 | 8/2010 |
| JP | 2010-260372 A | 11/2010 |
| JP | 2010260372 A * | 11/2010 |

OTHER PUBLICATIONS

German-language Written Opinion (PCT/ISA/237) issued in PCT Application No. PCT/EP2019/065193 dated Aug. 7, 2019 (five (5) pages).

German-language Search Report issued in German Application No. 10 2018 211 817.5 dated Mar. 24, 2021 with partial English translation (10 pages).

Chinese-language Office Action issued in Chinese Application No. 201980040501.3 dated Jul. 16, 2021 with English translation (14 pages).

Chinese-language Office Action issued in Chinese Application No. 201980040501.3 dated Jan. 25, 2022 with English translation (10 pages).

* cited by examiner

COLLISION PROTECTION DEVICE ON A MOTORIZED BICYCLE

BACKGROUND AND SUMMARY OF THE INVENTION

The invention relates to a collision protection device on a motorized bicycle, in particular a motorbike or motor scooter.

In the event of a frontal collision with an obstacle, as a result of the front wheel, a valuable enlargement of the distance between obstacle and rider can be achieved. This also plays a role in the case of motorized bicycles with restraint systems, for example, safety belts, in order to gain sufficient time to be able to reduce the forces acting on the rider to an acceptable extent.

It is, however, problematic that even small deviations in the straight-ahead position of the front wheel in the event of collision can bring about a rotation of the front wheel in relation to the vertical, which reduces the distance.

The object of the invention is to improve the collision protection in the case of a motorized bicycle.

This object is achieved with a collision protection device with the features according to claim 1. In the case of the collision protection device on a motorized bicycle, a catching element is provided which is arranged fixedly on a frame of the bicycle and which has a receptacle delimited by two guide portions, which receptacle is opened in the direction of a front wheel of the bicycle. The free ends, pointing in the direction of travel, of the guide portions are arranged so that they are always spaced apart from the front wheel in normal riding operation, but in the event of a frontal collision in which the front wheel strikes an obstacle, the front wheel is pushed beyond the free ends in the direction of the frame of the bicycle into the receptacle.

The receptacle ensures that the front wheel maintains its straight-ahead position in the event of a collision, i.e. does not turn in relation to the vertical or about the pivoting axis during the collision. The guide portions prevent a lateral making way and turning of the front wheel. It can thus be ensured that the distance which can be achieved by the front wheel is maintained in the event of a frontal collision.

Of course, the free ends of the guide portions should be arranged so that they always have a distance to the circumference of the front wheel during normal riding operation, i.e. even in the case of a significant turning of the handlebar do not come into contact with the front wheel.

The pushing in of the front wheel into the receptacle is preferably performed exclusively by the force of the collision, for example, by a deformation of a front wheel fork of the bicycle in the event of collision of the front wheel with the obstacle. An active movement of the front wheel or of the catching element is not necessary such that it is also not necessary to provide an additional mechanism for movement of the front wheel or the catching element.

Even a slight initial inclination of the front wheel, i.e. a rotation about the vertical, can be balanced out by a suitable form of the receptacle and in particular of the guide portions. In this case, the guide portions straighten out the front wheel as a result of contact during the pushing in into the receptacle.

For this purpose, the receptacle is advantageously formed so that it becomes increasingly narrow toward the rear of the bicycle. The front wheel is thus automatically centered and straightened out the further it pushes into the receptacle.

For example, the guide portions are positioned at an angle to one another which opens toward the free ends of the guide portions. The receptacle can open in a v-shape toward the free ends of the guide portions. An opening angle between 50° and 90°, in particular between 60° and 80°, has been shown to be suitable.

If the front wheel is straightened out, to a certain extent the front wheel fork, on which the front wheel is suspended, is straightened out or at least a further rotation in relation to the vertical during the collision is prevented.

A contact between front wheel and catching element can exclusively take place at the guide portions. It would, however, also be conceivable to provide a contact portion between the guide portions (in relation to a transverse direction of the bicycle), which contact portion serves the purpose of additional introduction of force into the frame if the front wheel is pushed so far into the receptacle that it bears against the contact portion. Otherwise, as is conventional, an introduction of force into the frame is performed primarily via the front wheel fork.

The catching element should, however, in any case be formed from metal and so rigid and dimensionally stable that it does not substantially deform in the event of a frontal collision since it must absorb the forces acting during the collision in order to guide and straighten out the front wheel. This means that the catching element must be able to absorb lateral forces of at least 1000 N without plastic deformation.

In one preferred embodiment, the two guide portions are fixed at their end opposite the free end on a fastening portion with which the catching element is fastened to the frame of the bicycle. A distance from the receptacle to the frame and to the front wheel can easily be specified via the length of the fastening portion without this influencing the length of the receptacle in the longitudinal direction and thus the distance of the free ends of the receptacle in the transverse direction.

The catching element can be formed in one piece. Fastening portion and guide portions can, however, also be composed of separate parts, for example, welded. It would also be conceivable to form the catching element in one piece with the frame. The catching element can optionally be integrated into a cladding of the frame, but it should always be connected to the frame in such a stable manner that it can absorb the forces which act during the collision without significant deformation.

The catching element is preferably fastened to the frame at the height of an axle of the front wheel. In particular, the fastening portion is advantageously oriented horizontally during normal riding operation so that collision forces can be introduced in a straight line from the contact point between obstacle and front wheel via the fastening portion along the longitudinal direction of the bicycle into the frame.

In one possible embodiment, the guide portions are formed in each case by a rod-shaped component, for example, a solid rod or a tube. Such a catching element generates a small additional weight and can be fixed to the frame in a visually unobtrusive manner, but can nevertheless be manufactured easily with the required stability.

In another possible embodiment, the guide portions have guide surfaces which are directed toward one another, wherein the guide surfaces extend substantially parallel to the vertical (as seen in the normal riding position of the bicycle). In this manner, the front wheel can be guided more precisely, while it is pushed into the receptacle.

As a further measure to improve collision protection, a rim of the front wheel can furthermore be manufactured from a material which deforms in the event of a collision in which the front wheel is pushed into the receptacle of the catching element without breaking. A further dissipation of energy can thus be achieved. The material used should give the rim a smaller spring action than is the case with a spoked front wheel, but should be deformable to a greater extent than a cast material. Aluminum alloys are, for example, suitable. Such a rim can of course also be used independently of the use of a catching element described above.

The catching element is preferably a fork which is welded directly on the frame and lies horizontally with two prongs pointing forward and pointing away from one another, which prongs between them can receive the front wheel, as shown in the following drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
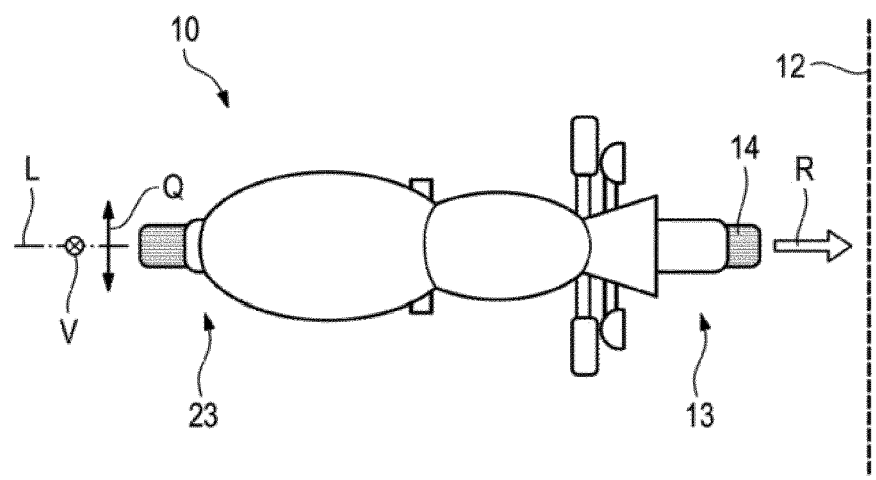
FIG. 1 shows a schematic top view of a motorized bicycle in a normal riding situation shortly before a frontal collision with an obstacle.
Figure 2:
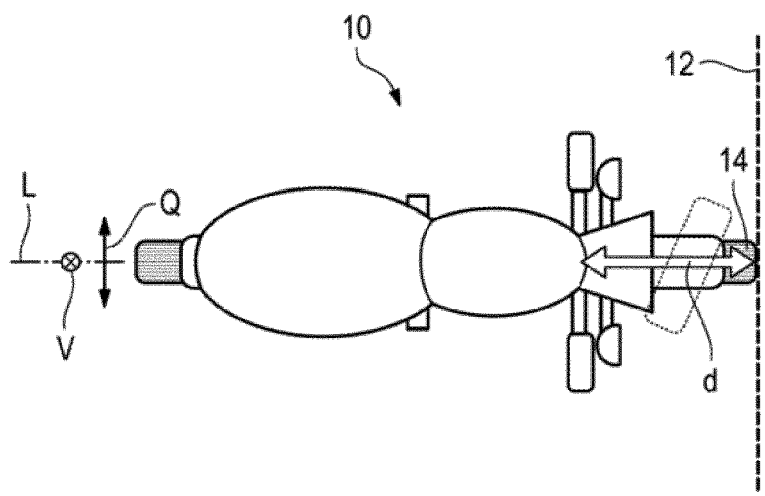
FIG. 2 shows the bicycle from FIG. 1 during a frontal collision with an obstacle.

FIGS. 1 and 2 illustrate the problem of a frontal collision in the case of motorized bicycle 10 in the event of a collision with an obstacle 12 along a driving movement in longitudinal direction L of bicycle 10. This is illustrated by the arrow in FIG. 1 which indicates direction of travel R when travelling straight ahead.

The contact with obstacle 12 occurs at a front 13 of bicycle 10 at the front side of a front wheel 14 (FIG. 2). If front wheel 14 strikes obstacle 12 in its straight-ahead position parallel to longitudinal direction L of bicycle 10, it creates a distance d between obstacle 12 (to be more precise, the point of contact between front wheel 14 and obstacle 12) and the rider of bicycle 10 (not represented). If, in the case of a conventional bicycle, front wheel 14, however, strikes obstacle 12 at an angle, it can arise that front wheel 14 rotates about vertical V, i.e. is inclined in transverse direction Q, which reduces distance d. This situation is represented by dashed lines in FIG. 2.

Figure 3:
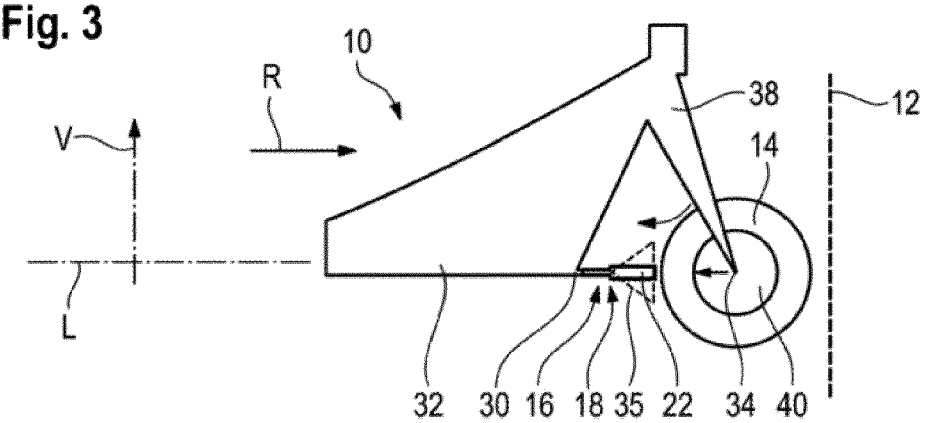
FIG. 3 shows a schematic side view of a motorized bicycle with a collision protection device according to an embodiment of the present invention in a normal riding situation shortly before a frontal collision with an obstacle.

In order to prevent such a rotation of front wheel 14, a collision protection device 16 is provided. FIG. 3 shows this.

Collision protection device 16 comprises a catching element 18 which has a receptacle 20 which is opened toward front wheel 14. Receptacle 20 is delimited by two guide portions 22 (see FIGS. 4 and 5) which in each case have a free end 24 which is adjacent to front wheel 14 in direction of travel R.

Both guide portions 22 are arranged here so that receptacle 20 tapers counter to direction of travel R in the direction of a rear 23 of the bicycle. In this example, both guide portions 22 are arranged at an angle α to one another which opens toward rear wheel 14. Angle α here is between 600 and 80°, it could, however, generally, for example, be between 50° and 90°.

Both guide portions 22 are in this example connected to a fastening portion 26 which here forms a transition at the apex of angle α into both fastening portions 22. A contact portion 28 can optionally be provided in the transition of both guide portions 22 into fastening portion 26.

The end of fastening portion 26 facing away from receptacle 20 is connected fixedly at a fixing point 30 to a frame 32 of bicycle 10, for example, by welding (see FIG. 3).

Catching element 18 is oriented so that fastening portion 26 is oriented along longitudinal direction L and extends horizontally (in the case of the normal upright vehicle position). Fixing point 30 of fastening portion 26 on frame 32 is here, in relation to vertical direction V, at the same height as an axle 34 of front wheel 14.

In the embodiment shown here, both guide portions 22 are formed by rods running in a straight line. Receptacle 20 therefore opens in a v-shaped manner toward front wheel 14.

Fastening portion 26 is here likewise a rod-shaped component. The diameter of guide portions 22 corresponds here approximately to the diameter of fastening portion 26.

Both guide portions 22 and fastening portion 26 can be formed to be solid or hollow in the form of tubes.

In another possible embodiment, a guide surface 35 is provided at each of guide portions 22, which guide surface 35 extends substantially parallel to vertical V so that receptacle 20 can engage around front wheel 14 over a larger region if front wheel 14 is pushed into receptacle 20 (indicated in FIG. 3).

Figure 4:
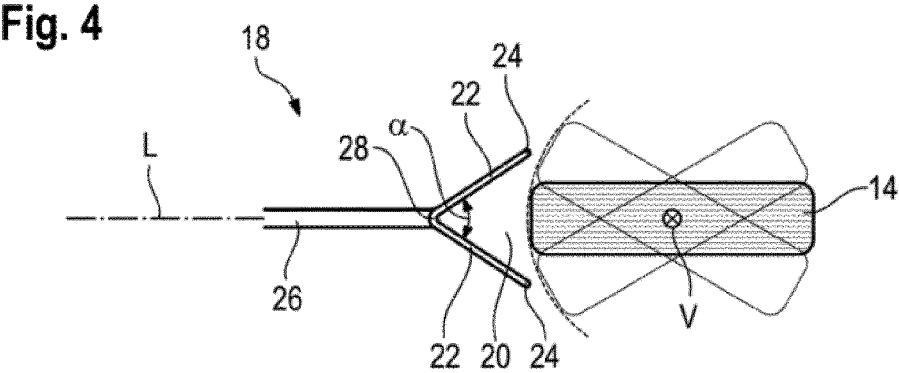
FIG. 4 shows a schematic top view of the collision protection device of FIG. 3 during a normal riding situation.

In all normal riding situations, free ends 24 of guide portions 22 are spaced apart from front wheel 14 to such an extent that front wheel 14 can be moved into any desired steering position without its circumference coming into contact with guide portions 22. In normal riding operation, catching element 18 has no action of any kind. As FIG. 4 shows, front wheel 14 can be rotated about vertical direction V without contact with catching element 18 arising, in particular with free ends 24 of guide portions 22.

Figure 5:
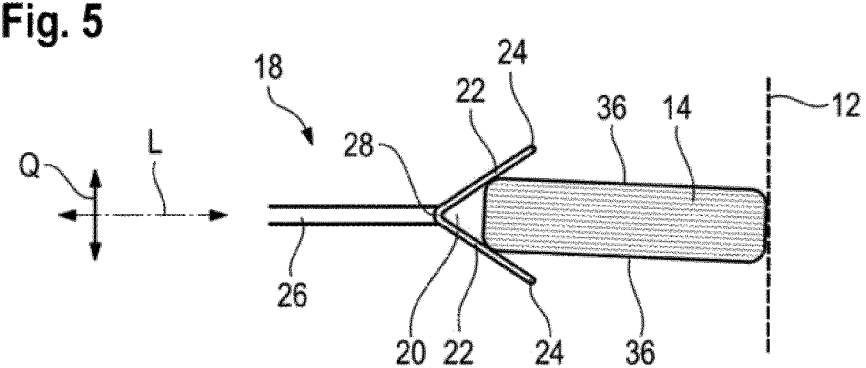
FIG. 5 shows the collision protection device of FIG. 3 during a frontal collision.

If, however, a frontal collision occurs and front wheel 14 strikes obstacle 12, as represented in FIG. 5, front wheel 14 is pushed beyond free ends 24 into receptacle 20 so that guide portions 22 lie next to sides 36 of front wheel 14 as seen in transverse direction Q.

This movement is performed, for example, in that a front wheel fork 38 of bicycle 10, on which front wheel 14 is suspended, is deformed counter to direction of travel R, as is conventionally known (see arrow in FIG. 3).

Front wheel 14 comes on one or both sides 36 into contact with one or both of guide portions 22 on its sides delimiting receptacle 20 and is introduced by guide portions 22 into receptacle 20.

As a result of the shape and arrangement of guide portions 22, front wheel 14 is retained substantially in its straight-ahead position, if at the start of contact with obstacle 12 it had a slight inclination, front wheel 14 is straightened out by both guide portions 22. In this case, a deviation of approximately +/−3° from the exact straight-ahead position can arise without distance d being noticeably impaired.

Overall catching element 18 is formed to be dimensionally stable so that it is not substantially deformed in the case of the forces prevailing in the event of collision and where possible can stabilize and retain front wheel 14 in its straight-ahead position over the entire collision process.

Front wheel 14 can optionally come to bear against contact portion 28 in order to be able to introduce a particularly high collision force directly into frame 32.

As a result of the arrangement of axle 34 of front wheel 14, fastening portion 26 and fixing point 30 of catching element 18 on frame 32 along the horizontal, the collision forces are introduced along longitudinal direction L of bicycle 10 where possible without a force component in transverse direction Q or vertical direction V into frame 32 of bicycle 10.

A rim 40 of front wheel 14 is formed here from a material which is deformed in a targeted manner in the event of the action of force by a frontal collision in which front wheel 14 is pushed into receptacle 20 in order to dissipate some of the collision energy.

The material is selected so that it would be less flexible than would be the case with a spoked front wheel and so that it does not break in the case of the force of such a collision. Tough aluminum alloys can be considered, for example, for this.

As a result of the deformation of rim 40 in combination with the action of catching element 18 to retain front wheel 14 in the straight-ahead position, some of the collision energy can be dissipated in a targeted manner, while it is simultaneously ensured that front wheel 14 cannot be inclined during deformation of rim 40. This offers significant improvement in safety, for example, in the case of helmet-free vehicles with safety belts.

Such a rim 40 can of course also be used independently of a collision protection device 16 described here.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A collision protection device on a motorized bicycle, comprising:
    a catching element configured to be fixed on a frame of the motorized bicycle,
    wherein
    the catching element includes a receptacle delimited by two guide portions,
    the receptacle is open toward a front wheel of the motorized bicycle, and
    free ends of the guide portions point in the direction of travel, and are arranged such that
    the guide portions are always spaced apart from the front wheel in normal riding operation,
    in the event of a frontal collision in which the front wheel strikes an obstacle and is pushed in the direction of the frame of the bicycle, the front wheel passes between the free ends of the guide portions into the receptacle, and
    the receptacle opens toward the free ends of the guide portions in a V-shaped manner toward the front wheel.

2. The collision protection device according to claim 1, wherein
    the receptacle narrows in a direction toward a rear of the bicycle.

3. The collision protection device according to claim 1, wherein
    the catching element is formed such that the catching element does not substantially deform in the event of a frontal collision.

4. The collision protection device according to claim 1, wherein
    the receptacle includes a fastening portion configured for fastening catching element to the frame, and
    the guide portions are fixed at their ends opposite their free ends on the fastening portion.

5. The collision protection device according to claim 1, wherein
    the catching element is configured to be fastened to the frame at a height above ground at a height of an axle of the front wheel.

6. The collision protection device according to claim 1, wherein
    the guide portions have guide surfaces directed toward one another, and
    the guide surfaces extend substantially vertically.

7. The collision protection device according to claim 1, wherein
    a rim of the front wheel is formed from a material selected to deform without braking in the event of a collision in which the front wheel is pushed into the receptacle of the catching element.

8. A collision protection device on a motorized bicycle, comprising:
    a catching element configured to be fixed on a frame of the motorized bicycle,
    wherein
    the catching element includes a receptacle delimited by two guide portions,
    the receptacle is open toward a front wheel of the motorized bicycle, and
    free ends of the guide portions point in the direction of travel, and are arranged such that
    the guide portions are always spaced apart from the front wheel in normal riding operation,
    in the event of a frontal collision in which the front wheel strikes an obstacle and is pushed in the direction of the frame of the bicycle, the front wheel passes between the free ends of the guide portions into the receptacle, and
    each of the guide portions are formed by a rod-shaped component.

* * * * *